No. 781,750. PATENTED FEB. 7, 1905.
G. F. STEWART & C. S. JOHNSON.
HEELING MACHINE.
APPLICATION FILED MAY 1, 1903.

8 SHEETS—SHEET 2.

WITNESSES:
Ellen B. Tomlinson
Frank Carroll

INVENTORS
George F. Stewart
Charles S. Johnson
by Alex. P. Browne
attorney

No. 781,750. PATENTED FEB. 7, 1905.
G. F. STEWART & C. S. JOHNSON.
HEELING MACHINE.
APPLICATION FILED MAY 1, 1903.

8 SHEETS—SHEET 3.

WITNESSES:
Eleen B. Tomlinson
Frank Carroll

INVENTORS
George F. Stewart
Charles S. Johnson
by Alex P. Browne
attorney.

No. 781,750. PATENTED FEB. 7, 1905.
G. F. STEWART & C. S. JOHNSON.
HEELING MACHINE.
APPLICATION FILED MAY 1, 1903.

8 SHEETS—SHEET 4.

WITNESSES:
Eleanor B. Tomlinson
Frank Carroll.

INVENTORS
George F. Stewart
Charles S. Johnson
by Alex. P. Browne.
attorney

No. 781,750. PATENTED FEB. 7, 1905.
G. F. STEWART & C. S. JOHNSON.
HEELING MACHINE.
APPLICATION FILED MAY 1, 1903.

8 SHEETS—SHEET 7.

WITNESSES:
Ellen B. Tomlinson
Frank Carroll.

INVENTORS
George F. Stewart.
Charles S. Johnson
by Alex. P. Browne,
attorney

No. 781,750.
Patented February 7, 1905.

UNITED STATES PATENT OFFICE.

GEORGE F. STEWART AND CHARLES S. JOHNSON, OF LYNN, MASSA-
CHUSETTS.

HEELING-MACHINE.

SPECIFICATION forming part of Letters Patent No. 781,750, dated February 7, 1905.

Application filed May 1, 1903. Serial No. 155,144.

*To all whom it may concern:*

Be it known that we, GEORGE F. STEWART and CHARLES S. JOHNSON, citizens of the United States, and residents of Lynn, in the county of Essex and State of Massachusetts, have invented certain new and useful Improvements in Heeling-Machines, of which the following is a specification.

Our invention relates to improvements in heeling-machines, and in the present specification we have shown and described them as applied to a machine of the type patented to H. A. Henderson June 20, 1882, and long known in the art as the "National" heeling-machine.

As our invention relates entirely to improvements in the devices which lie above the main bed-plate of the machine, we have in the accompanying drawings indicated only a portion of the mechanism below said bed-plate, as we believe the same to be entirely familiar to those skilled in the art.

Figure 1:
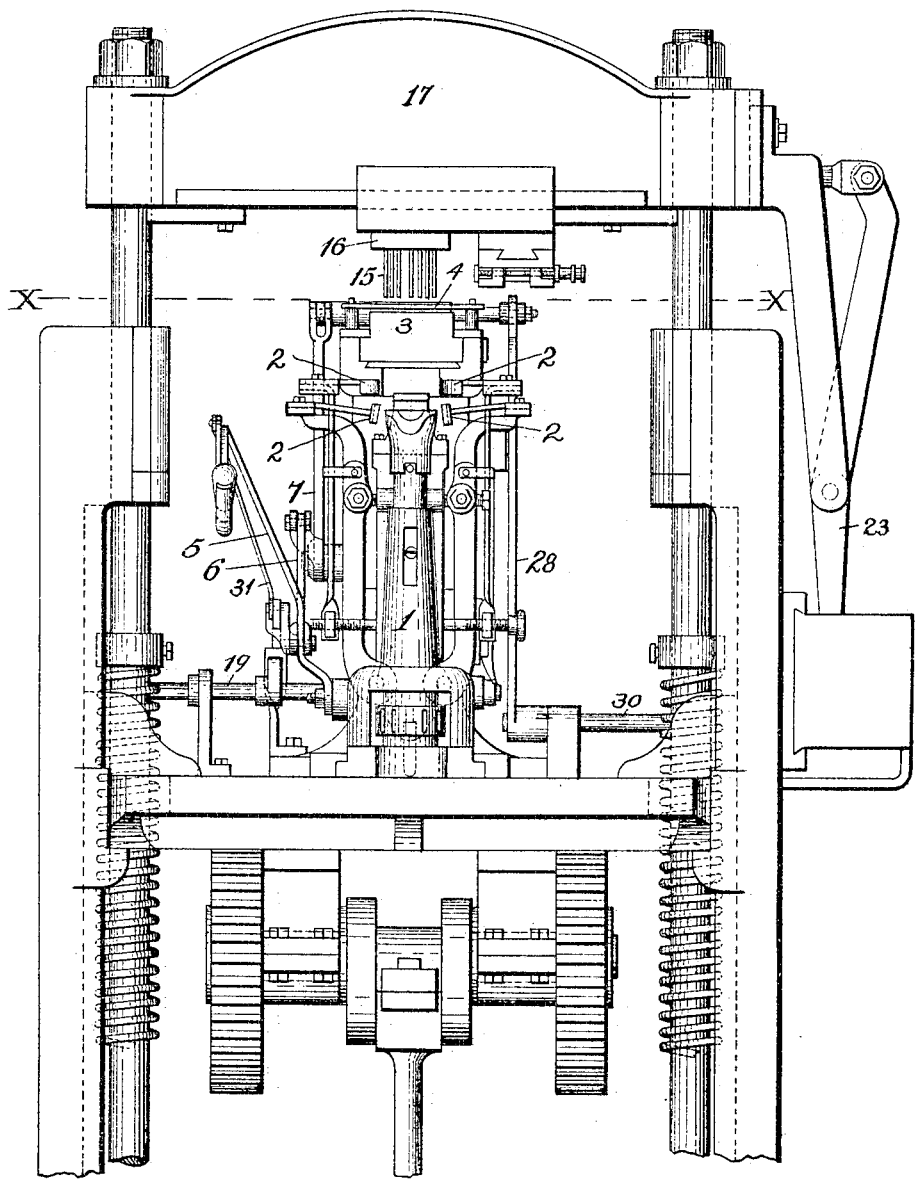
Figure 2:
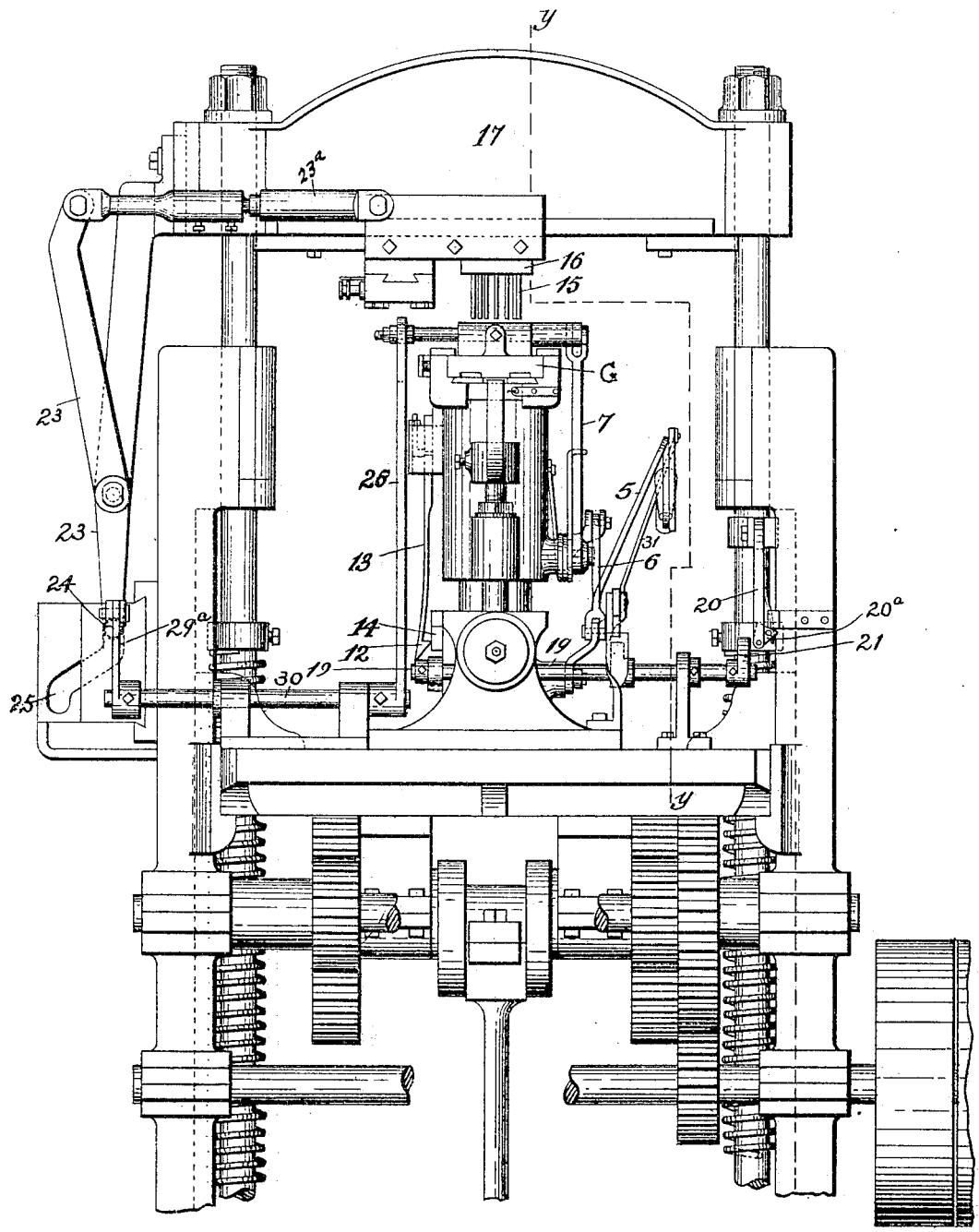
Figure 3:
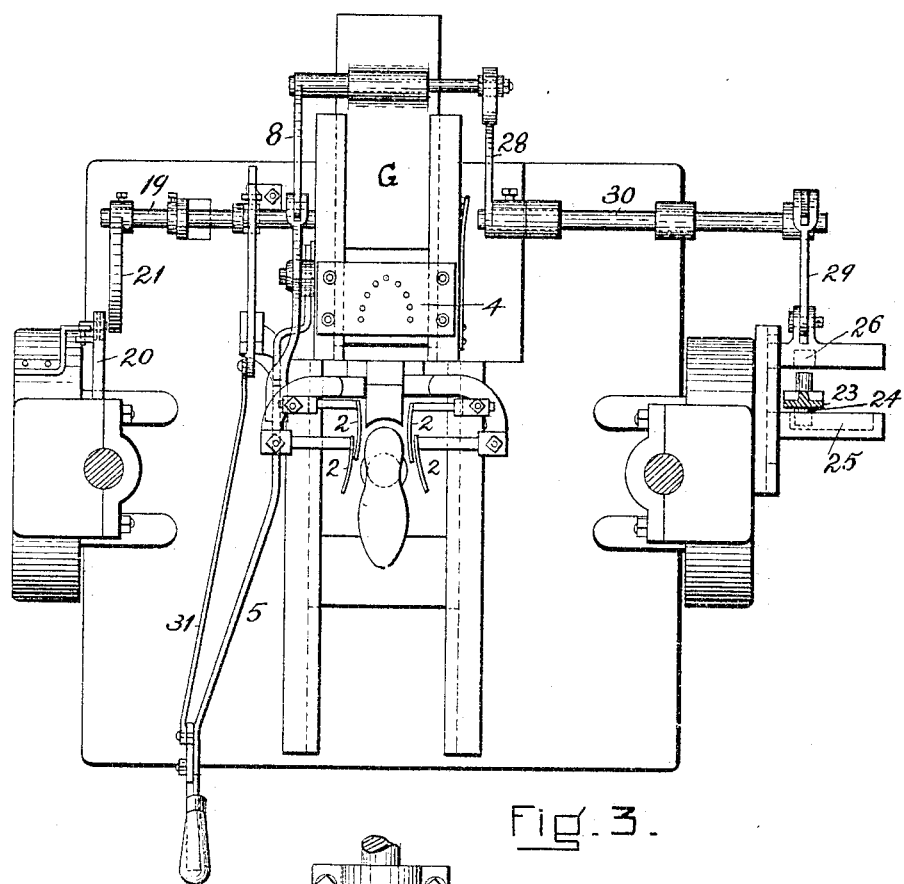
Figure 4:
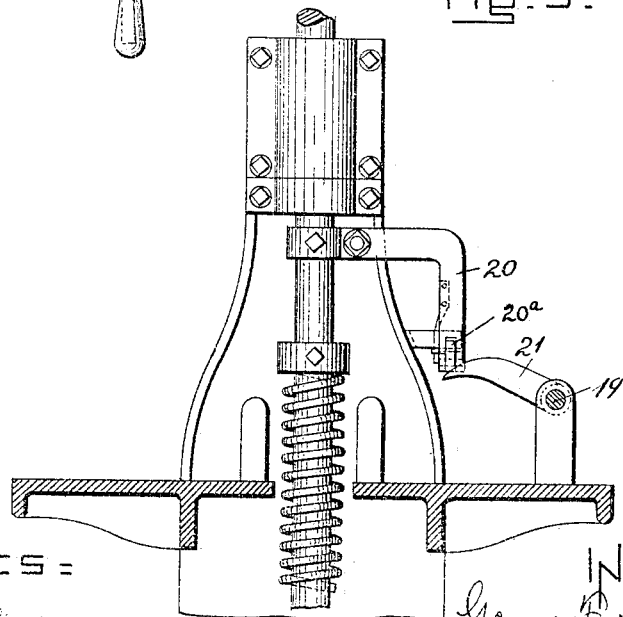
Figure 5:
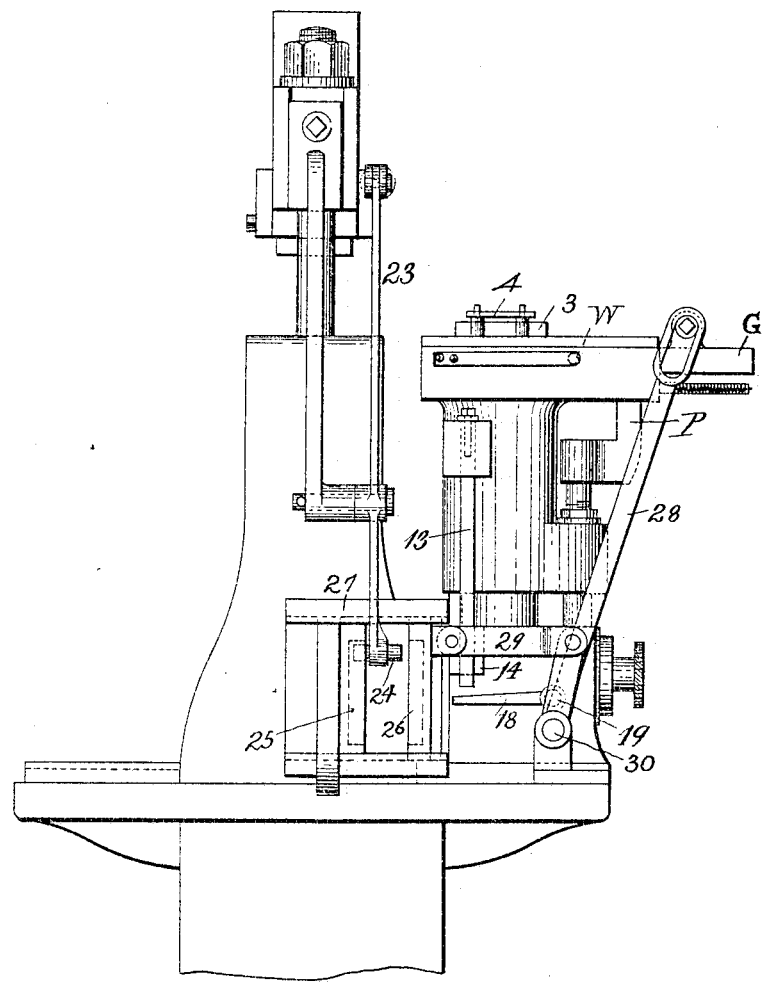
Figure 6:
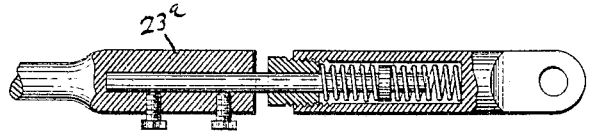
Figure 7:
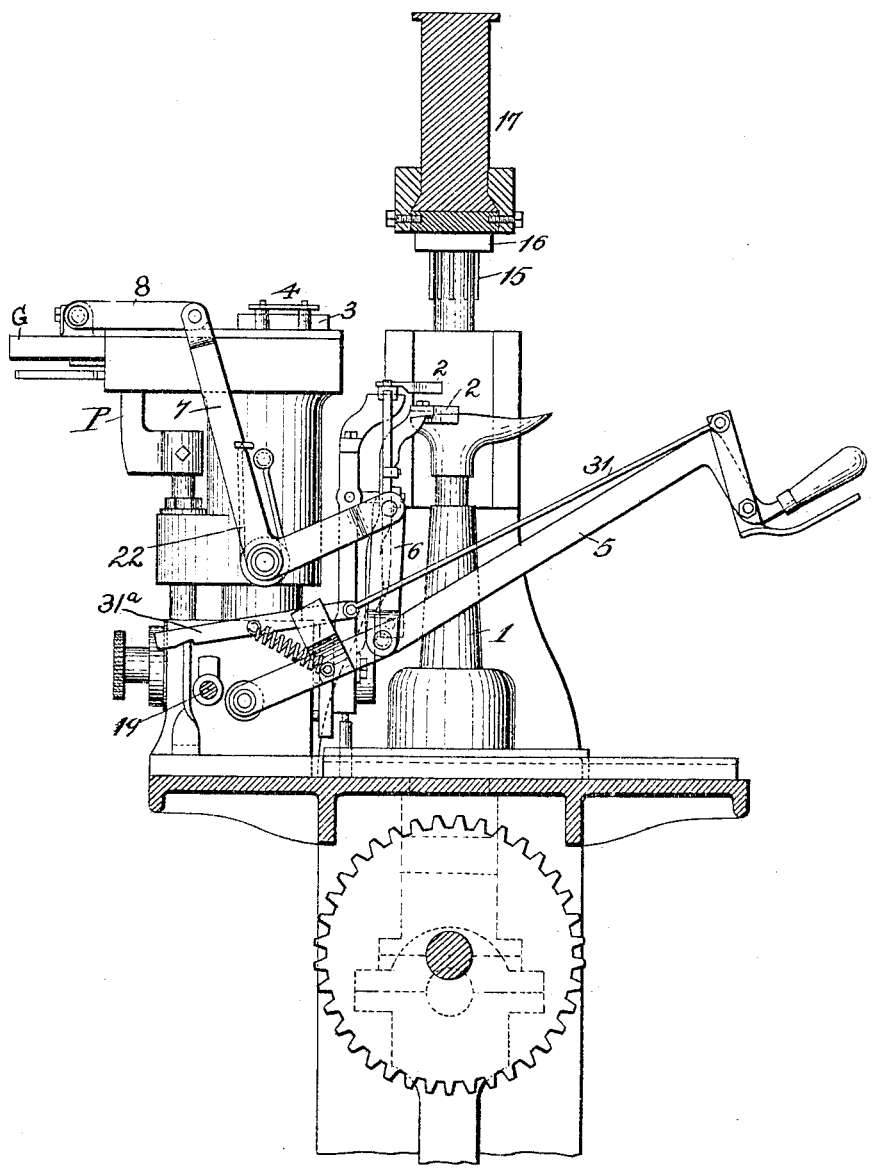
Figure 8:
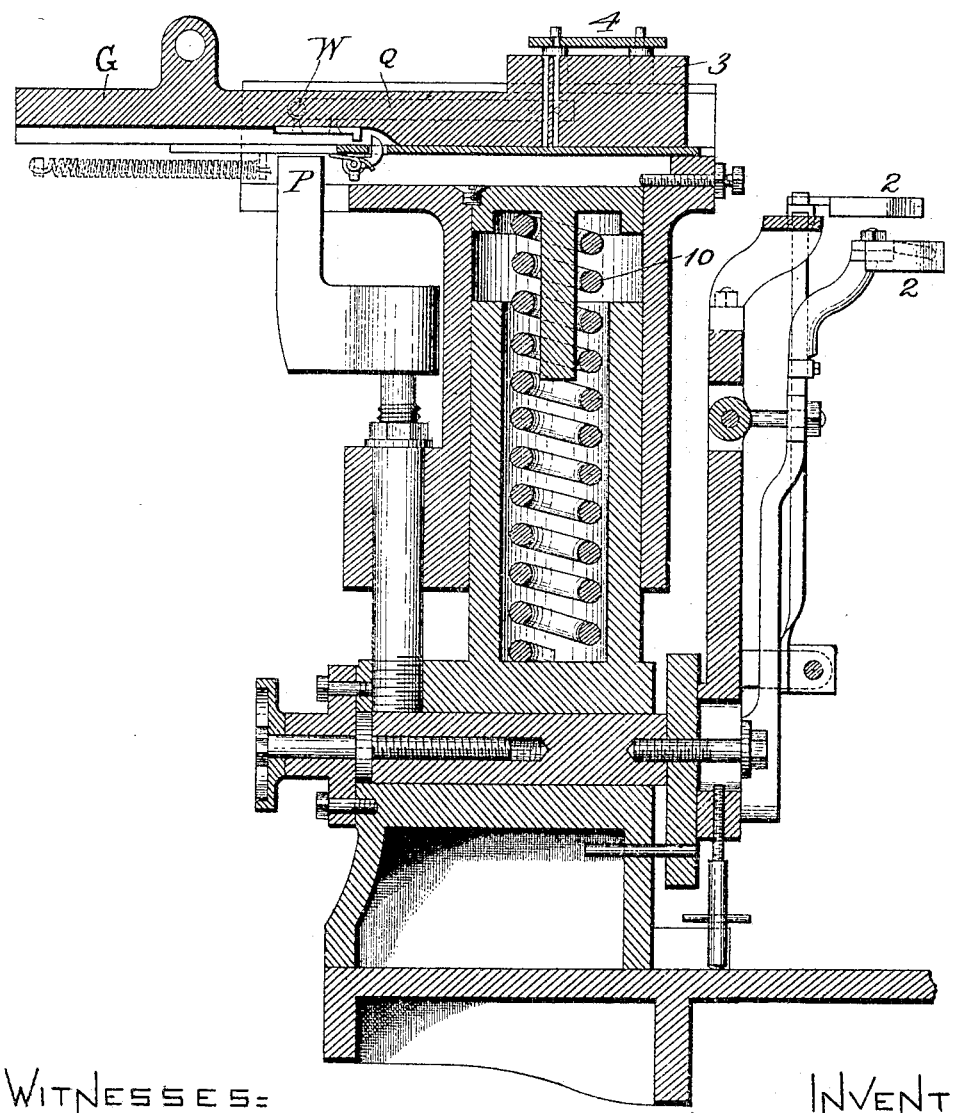
Figure 9:
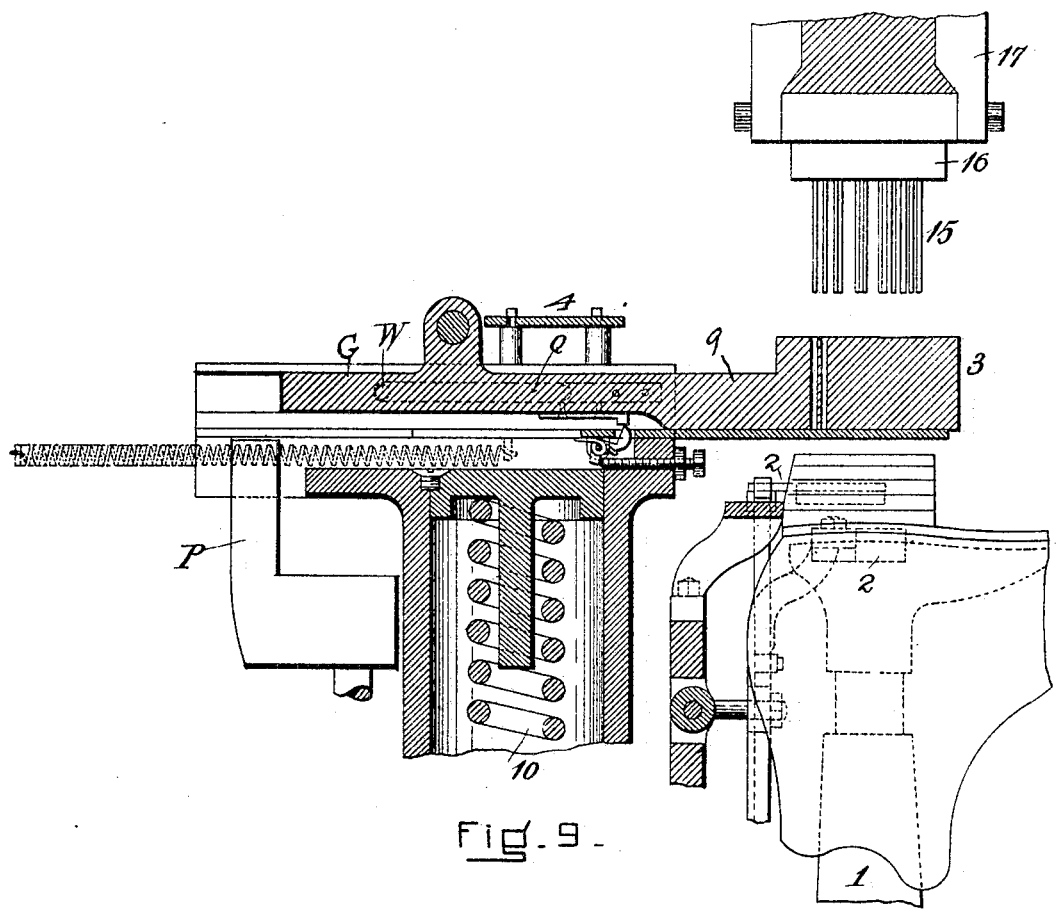
Figure 10:
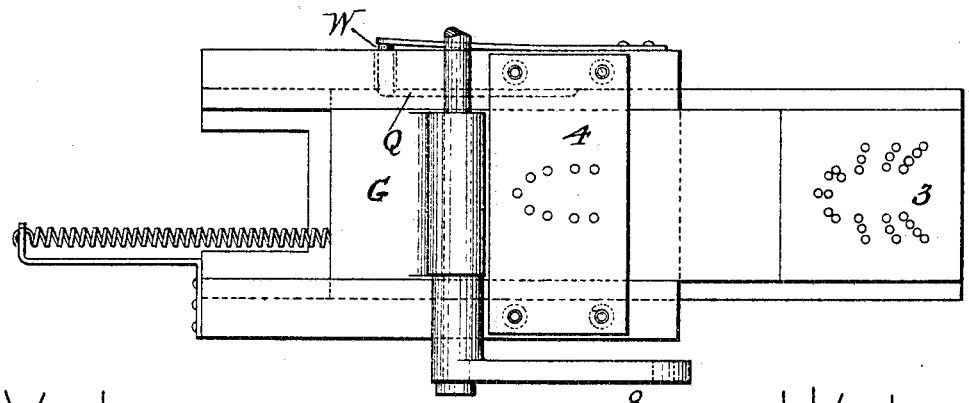
Figure 11:
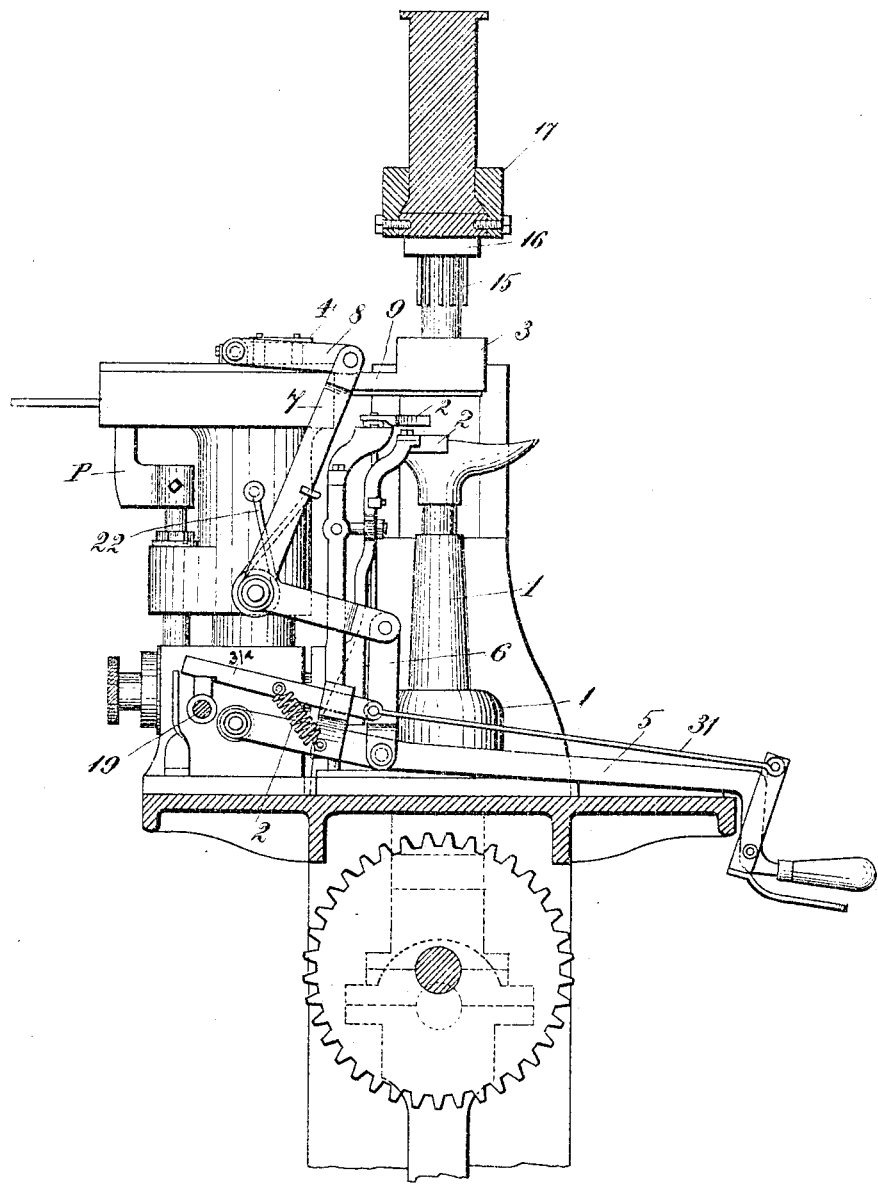

In the drawings, Figure 1 is a front view of the machine with our improvements applied thereto, and Fig. 2 is a rear view. Fig. 3 is a view in top plan and partial section, the section being on the line $x$ $x$ of Fig. 1. Figs. 4, 5, and 6 are enlarged views of portions of the mechanism to be hereinafter more fully described. Fig. 7 is a side view upon the vertical section-line $y$ $y$ of Fig. 2. Fig. 8 is a similar view, in central vertical section, of the nail-plate supporting and actuating mechanism and connecting parts. Fig. 9 is an enlarged view of a portion of Fig. 8. Fig. 10 is an enlarged view in plan of the nail-plate, feeding templet, and connecting parts. Fig. 11 is a similar view in elevation of such portion of the machine as is necessary to illustrate the manner of unlocking the nail-block and restoring it to its original position without operating the machine, as hereinafter more fully explained.

In machines of the type in question the work to be done is usually twofold—viz., the attaching of the heel proper and the subsequent attachment of the top lift. A portion of our present improvement lies in devices whereby these two operations may be performed consecutively by the machine, which is the more common method, or whereby either operation may be performed continuously for any desired number of times without the other. The machine is thereby adapted, among other things, to be worked in the ordinary way, in which the top lift is spanked on separately, and also for applying "surface-nailed" heels, where the whole of the heel, including the top lift, is applied at one operation.

In machines of the character to which our present improvements are adapted a nail-plate or nail-carrier is employed consisting of a metal block containing vertical perforations properly disposed to receive and hold the nails to be driven. This block is provided with a number of perforations to contain the nails required for attaching heels of various shapes and sizes, while for a particular shape and size the particular perforations to be filled are determined by the use of a templet arranged above the heel-block and perforated only to correspond to the location of the nails in the given heel. This templet of course is changed for each size or shape of heel involving a different location of the driven nails and is so constructed that its perforations register with certain perforations in the nail-block. In operation an attendant, usually a boy, supplies the nail-block with the necessary nails by dropping one through each of the perforations of the templet, the nails so dropped being thereby guided into their proper places in the nail-block. In order to support the nails in the perforations of the nail-block, a thin plate is provided, arranged to cover the lower ends of the perforations when the block is in position to be filled with nails, but to be moved away when the block is over the heel, the latter then serving as a support for the nails until driven. When the nail-block is brought forward as described, the nail-covering plate moves forward with it until the block is in position over the shoe, when the plate is withdrawn by the tension of a coiled spring, against which tension it had been held while carried forward with the block by means of a dog or finger until the block reached its foremost position over the heel. At this time the dog or finger is tripped by coming in contact with a stop, and the tension of the spring draws the covering-plate back to its normal rearward position.

All the foregoing mechanism is old and well known in the art. Its embodiment in the machine shown in the drawings will be hereinafter specifically pointed out.

After the shoe to receive the heel has been put in place with the sole up upon the jack 1, which for convenience is made to slide in and out upon the bed-plate of the machine in the ordinary manner, the jack is slid into its inner or working position, and the heel to be attached is placed upon the sole of the shoe upon the jack by the operator, its position thereon and the position of the shoe itself being centered by appropriate guides 2 2, (see Figs. 1, 7, and 9,) so that the heel may be in proper alinement and ready for the descent of the nail-drivers to be hereinafter described. The nail-block 3, (see Figs. 7, 8, 9, and 10,) which has already been filled in the manner described by the use of the templet 4, (also well shown in Fig. 3,) is now moved into position over the heel and in line with the gang of nail-drivers, which are adapted to be forced downward, as will be hereinafter more fully described. This motion of the nail-block is accomplished by means of the lever 5, preferably hand-operated, which through the link 6, the bell-crank lever 7, and link 8 is attached to a sliding plate marked 9 and shown as formed as an extension of the block 3. (See Figs. 8 and 9.) After the block 3 has thus been brought into its forward position it is desirable to force it downward, so as to bear firmly upon the heel and hold it in place on the shoe, and also desirable to lock it when thus positioned. This drawing down of the block and locking it in position is accomplished by the continuation of the same motion of the lever 5 by which the block was moved out; the lever for this purpose being still further pressed down against the pressure of a spring 10, upon which the plate supporting the nail-block is mounted. When the sliding plate upon which the nail-block 3 is located has been drawn to the front by the continued movement of the lever down against the pressure of the spring 10, the rear end G of the sliding plate is carried down past a post or extension P, thus locking the nail-block 3 against any backward motion until the plate which carries it has been raised vertically by the action of the spring 10. This plate is also locked against forward motion by the pin W engaging with the slot Q, as shown in Figs. 9 and 10. It will be seen, therefore, that when the hand-lever is depressed the plate upon which the nail-block 3 is mounted is first drawn forward until it clears the post or extension P and then is moved vertically downward, the spring 10 being at the same time depressed. This locking device is important, as the drivers must be finally in position to perfectly match the perforations in the nail-block upon the descent of the cross-head. This arrangement of the plate with reference to the post or extension P is such that it insures an upward vertical motion of the nail-block 3 sufficient to clear the ends of the nails which are left projecting through the heel to receive the top lift. Were it not for this arrangement the nail-block 3 would have a tendency to move backward horizontally, and consequently bend the ends of the nails. The above matter is well shown in Figs. 8 and 10. The locking down of the block in its forward position is accomplished by means of a notch 12, formed on the end of a spring-arm 13, (see Fig. 2,) which is mounted upon and carried down by the part which supports the nail-block when the same is depressed and which in its depressed position engages with a shoulder 14, formed upon the base of the spring-supporting device. This locking device is well known in the art. The nails in the nail-block are now in position to be driven into the heel. This is accomplished in the ordinary way by a gang of drivers 15, attached to the driving-block 16 and positioned thereon to correspond to the positions of the perforations in the nail-block 3. These drivers are now forced down by depressing the cross-head 17 of the machine, upon which the driving-block is carried. The machine performs this operation automatically when the operator depresses a treadle. This treadle and the operating mechanism of the machine are not shown because, as already stated, the construction is well known, particularly as embodied in the "National" machine. Upon the descent of the cross-head the drivers enter the perforations in the nail-block and force the nails which are therein downwardly through the heel into the sole of the shoe, thereby securing the two together, and by the continued operation of the machine the drivers return to their upper position and the machine stops. On this return or up stroke of the cross-head the nail-block is unlocked and after the driver has risen sufficiently high is carried back to its original position. The unlocking of the nail-block is performed as follows: It will be remembered that it was locked down by the notch 12 on the end of the spring-arm 13 engaging the projection 14. To release this notch from its engagement, an arm 18, attached to a rock-shaft 19, Fig. 5, is so disposed with reference to the notch on the end of the spring-arm 13 that when the shaft is rocked the spring-arm is forced out and the notch released from engagement. The rocking of this shaft is accomplished upon the return or up stroke of the cross-head of the machine by an extension 20, attached to an arm which is carried by and moves with the cross-head, which extension is provided with a pivotally-supported projection 20ª, which as the cross-head rises engages with and lifts a pawl or arm 21, attached to the rock-shaft 19. (See Figs. 3 and 4.) As soon as the notch is disengaged the spring 10 forces the nail-block up and another spring, 22, which has been actuated by the bell-crank lever 7 and compressed by the original moving forward of the hand-lever 5, being now free to act carries the hand-lever and by means of its connection with the nail-block also carries the latter back to their original positions. This spring 22 is well shown at Fig. 7.

It will be understood that the projection 20ª is so mounted on the extension 20 that when the cross-head descends it will be rocked about its pivot when coming in contact with pawl 21 and will not, therefore, actuate the rock-shaft 19. During the upward movement of the cross-head, however, the said projection 20ª is prevented from turning, and by its engagement with the pawl 21 the shaft 19 is rocked, as aforesaid.

If the class of goods for which the machine is being used is that most commonly employed, in which a top lift is to be subsequently spanked on or driven onto the ends of the nails which are left projecting from the heel, another operation must take place, which is as follows: First, the spanking device must be brought into the position immediately above the heel formerly occupied by the driving device. To this end the spanking and driving devices are both mounted upon a bed adapted to be slid sidewise upon the cross-head of the machine into and out of the position immediately over the heel. The operation of the machine heretofore described had left the driving device in this position. To remove this and put in its place the spanking device, a lever 23 is provided, which is connected at its upper end by a connecting-rod 23ª with a sliding block 16 and having its power end formed with a pin 24. A pair of slots 25 26, (see Fig. 3,) one, 25, inclined, as shown in Fig. 2, and the other, 26, vertical, are formed in the opposite walls of what may be termed a "box" 27, which, as shown in Fig. 5, is made movable, so that either slot may be made to engage or disengage at pleasure with the stud on the power end of the lever 23. The movement of the box for this purpose is obtained by means of a link 29, connecting it with an arm 29ª, mounted upon a rock-shaft 30, which rock-shaft is connected by a link 28 with and is operated by the motion of the nail-block carrier. As has before been pointed out the motion of this nail-block carrier is imparted to it by the hand-lever 5. If this hand-lever is not operated, the parts are in the position shown in Fig. 5, with the pin 24 engaging with the inclined slot. If now the treadle of the machine be again depressed, the lever 23 is carried downward by reason of its attachment to the cross-head and is also swung by the operation of the inclined slot, and swinging this lever slides the block carrying the driving and spanking device, sand thereby moves the driver out of place and the spanker in place over the heel, the return or up stroke of the cross-head restoring the parts to their original position.

In order to obtain a positive and exact motion of the block 16 from one position to another, the connecting-rod 23ª is made in two parts longitudinally, which are united by means of an interiorly-located plunger and spring, as shown at Fig. 6.

When it is desired to have the cross-head of the machine descend and ascend with the driving mechanism in place to drive, the hand-lever 5 is drawn forward, as above described, and the pin 24 on the end of the lever 23 is thus brought into the vertical slot 26, the walls of which serve to lock the said lever against movement around its fulcrum, while still permitting it to ascend and descend with the cross-head.

It is sometimes desirable to be able to unlock the nail-block after it has been locked and to restore it to its original position without operating the machine. For this purpose a supplemental lever is mounted upon the hand-lever 5, which supplemental lever is connected by a link or rod 31 with a bar or plate 31ª, which (see Fig. 7) engages with a projection on and is adapted to operate the rock-shaft 19, thereby releasing the notch 12 of the spring-arm 13. This will be clearly seen by an examination of Fig. 11, in which the parts are shown in the position they occupy when the nail-block has been brought down and locked. In order to unlock the block by hand, the workman moves the supplemental lever, which, through the rod 31 and bar 31ª, rocks the shaft 19 and releases the notch 12.

We claim—

1. In a machine of the character described, the combination of a nail-driving device, a top-lift-spanking device, and means controlled by the operator whereby either of said devices may be automatically and continuously brought into operative position.

2. In a machine of the character described, the combination with a movable nail-block, and means for locking said block in operative position, of a hand-operated device whereby the nail-block is brought forward, downward, and into engagement with said locking means at a single operation.

3. In a machine of the character described, the combination with a movable nail-block, and means for locking said block in operative position, of a hand-operated device whereby the nail-block is brought forward, downward, and into engagement with said locking means at a single operation, and means for subsequently automatically unlocking the nail-block.

4. In a machine of the character described, the combination with a movable nail-block, and means for locking said block in operative position, of a hand-operated device whereby the nail-block is brought forward, downward, and into engagement with said locking means at a single operation, and means for automatically unlocking, lifting, and carrying back the nail-block.

5. In a machine of the character described, the combination with a movable nail-block, and means for locking said block in operative position, of a hand-operated device whereby the said block may at a single operation be carried forward to a predetermined position, carried downward, and brought into engagement with said locking means when in its downward position.

6. In a machine of the character described, the combination with a nail-block of means for unlocking the block when locked down, automatically carrying it upward a predetermined distance, and then carrying it backward.

In testimony whereof we have hereunto subscribed our names this 7th day of April, 1903.

GEORGE F. STEWART.
CHARLES S. JOHNSON.

Witnesses:
ALEX. P. BROWNE,
ELLEN B. TOMLINSON.